US010654429B2

(12) United States Patent
Nakamura et al.

(10) Patent No.: US 10,654,429 B2
(45) Date of Patent: May 19, 2020

(54) CIRCUIT BODY FOR VEHICLE

(71) Applicant: Yazaki Corporation, Minato-ku, Tokyo (JP)

(72) Inventors: Masashi Nakamura, Utsunomiya (JP); Masahiro Furukawa, Utsunomiya (JP); Satoshi Enomoto, Utsunomiya (JP); Akiyoshi Kanazawa, Utsunomiya (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 16/293,219

(22) Filed: Mar. 5, 2019

(65) Prior Publication Data

US 2019/0275967 A1 Sep. 12, 2019

(30) Foreign Application Priority Data

Mar. 7, 2018 (JP) .................. 2018-041026

(51) Int. Cl.
*B60R 16/02* (2006.01)
*H02B 1/26* (2006.01)
*B60R 16/03* (2006.01)
*B60R 16/023* (2006.01)
*H02H 7/22* (2006.01)

(52) U.S. Cl.
CPC .......... *B60R 16/03* (2013.01); *B60R 16/0207* (2013.01); *B60R 16/0238* (2013.01); *B60R 16/0315* (2013.01); *H02B 1/26* (2013.01); *H02H 7/226* (2013.01)

(58) Field of Classification Search
None
See application file for complete search history.

(56) References Cited

U.S. PATENT DOCUMENTS

| 5,675,189 A | 10/1997 | Anma et al. | |
|---|---|---|---|
| 5,818,673 A * | 10/1998 | Matsumaru | ............... H02J 1/06 361/63 |
| 5,971,799 A * | 10/1999 | Swade | ................ B60R 16/0207 439/502 |
| 6,291,770 B1 * | 9/2001 | Casperson | .......... B60R 16/0207 174/139 |

(Continued)

FOREIGN PATENT DOCUMENTS

CN 1960893 A 5/2007
EP 0529650 A2 3/1993
(Continued)

*Primary Examiner* — Courtney L Smith
(74) *Attorney, Agent, or Firm* — Banner & Witcoff, Ltd.

(57) ABSTRACT

A circuit body for a vehicle includes: a plurality of control boxes dispersedly arranged on the circuit body; a trunk harness connecting one of the control boxes to another of the control boxes; and a branch harness connecting the control boxes to the electric component. The control boxes, the trunk harness and the branch harness are configured to ground a power circuit and a signal circuit through grounding routes different from each other. The power circuit supplies the electric power from a power source to the electric component through the control boxes. The signal circuit transmits a communication signal between the control boxes and the electric component and between one of the control boxes and another of the control boxes.

4 Claims, 4 Drawing Sheets

(56) References Cited

U.S. PATENT DOCUMENTS

| | | | |
|---|---|---|---|
| 6,900,555 B2 * | 5/2005 | Sakamoto | H02J 1/06 307/10.1 |
| 10,017,135 B2 * | 7/2018 | Tsukamoto | H01R 4/34 |
| 10,040,409 B2 * | 8/2018 | Kikuchi | B60R 16/0207 |
| 10,099,634 B2 * | 10/2018 | Shiratori | B60R 16/0207 |
| 10,131,293 B2 * | 11/2018 | Hida | B60R 16/0207 |
| 2004/0227402 A1 | 11/2004 | Fehr et al. | |
| 2011/0301782 A1 * | 12/2011 | Yamamoto | B60N 2/002 701/1 |
| 2015/0349471 A1 * | 12/2015 | Maki | H01R 13/6691 307/10.1 |
| 2018/0118138 A1 * | 5/2018 | Tsukamoto | H01R 4/34 |

FOREIGN PATENT DOCUMENTS

| | | |
|---|---|---|
| JP | 2005-078962 A | 3/2005 |
| JP | 2009-006773 A | 1/2009 |
| WO | 2004/103771 A2 | 12/2004 |

* cited by examiner

CIRCUIT BODY FOR VEHICLE

CROSS-REFERENCES TO RELATED APPLICATION(S)

This application is based on and claims priority from Japanese Patent Application No. 2018-041026 filed on Mar. 7, 2018, and the entire contents of which are incorporated herein by reference.

BACKGROUND

Field of the Invention

The present invention relates to a circuit body for a vehicle.

Description of Related Art

A circuit body (so-called wire harness) for connecting power sources or the like mounted on a vehicle with various electric components or the like has been known. Such a circuit body is generally arranged so that electric power can be properly supplied from an alternator (generator) and a battery as main power sources to a large number of electric components (such as an ECU and various accessories), a mode can be properly changed over between a power feeding mode and a power blocking mode, and various communication signals can be transmitted.

Specifically such a circuit body (wire harness) is typically constituted by an electric wire bundle which is an assembly of a wide variety of electric wires for connecting power sources with electric components, a junction block for distributing electric power to a plurality of systems, a relay box for controlling feeding or blocking of the electric power for each system, and a fuse box for protecting the electric wires and the electric components from an excessive current and so on.

As for details of the above protector, refer to JP 2005-078962 A and JP 2009-006773 A.

SUMMARY

Recently with increase of electric components mounted on vehicles and complication of control thereof, structures of circuit bodies (wire harnesses) tend to be complicated. As a result, the number of electric wires constituting each circuit body tends to increase, and the circuit body itself tends to increase in size. Thus, the circuit body tends to increase in weight. In addition, with increase in different kinds of vehicles to be mounted with circuit bodies or increase in kinds of optional electric components, the number of kinds of circuit bodies to be manufactured tends to increase, and steps of manufacturing the circuit bodies also tend to be complicated. Thus, the manufacturing cost and the manufacturing time of each circuit body tend to increase.

An object of the invention is to provide a circuit body for a vehicle, in which the structure of the circuit body is simplified while keeping functions required as a circuit body for a vehicle.

Embodiments of the present invention provide the following items (1) to (4):

(1) A circuit body for a vehicle, the circuit body being mounted on a vehicle body to supply electric power from a power source to an electric component and to transmit a communication signal, the circuit body comprising:

a plurality of control boxes dispersedly arranged on the circuit body and configured to be able to control input and output of at least one of the electric power and the communication signal;

a trunk harness connecting one of the control boxes to another of the control boxes; and a branch harness connecting the control box to the electric component, the control boxes, the trunk harness and the branch harness being configured to ground a power circuit and a signal circuit through grounding routes different from each other, the power circuit supplying the electric power from the power source to the electric component through the control boxes, the signal circuit transmitting the communication signal between the control boxes and the electric component and between one of the control boxes and another of the control boxes.

(2) The circuit body according to item (1), wherein:

the power circuit is connected to a negative terminal of the power source through a grounding route that goes through the vehicle body; and the signal circuit is connected to the negative terminal of the power source through a grounding route that does not go through the vehicle body.

(3) A circuit body according to item (1) or item (2), wherein:

the trunk harness includes a power line for transmitting the electric power, a communication line for transmitting the communication signal, and a signal earth line corresponding to the grounding route for the signal circuit; and the branch harness includes a power line for transmitting the electric power, a communication line for transmitting the communication signal, a signal earth line corresponding to the grounding route for the signal circuit, and a power earth line corresponding to the grounding route for the power circuit.

(4) A circuit body according to any one of item (1) to item (3), wherein:

at least one of the control boxes and the electric component is configured to ground the power circuit to the vehicle body.

According to first aspect of the invention, relating to the item (1), the outline of the circuit body is built by the trunk harnesses and the branch harnesses, while supply of electric power and transmission of communication signals to the electric components through the circuit body are achieved by the control boxes disposed and distributed on the circuit body. Accordingly, for example, when the transmission of the communication signals is collected into a single communication line by multiplex communication among the control boxes and the transmission of the electric power is also collected into a single power line, the structure of the circuit body can be simplified in comparison with a circuit configuration in which a power source is connected to electric components essentially in a one-to-one manner as in a background-art circuit body. In addition, when processing such as distribution of electric power to a plurality of systems, control of feeding or blocking of the electric power for each system, protection of the electric wires and the electric components from an excessive current or the like, etc. is performed in the control boxes, it is possible to dispense with any junction box used in the background-art circuit body. Thus, the structure of the circuit body can be further simplified.

Further, a circuit for electric power (so-called power circuit) serving for supplying the electric power and a circuit for signals (so-called signal circuit) serving for transmitting the communication signals are grounded through grounding routes different from each other. To say other words, the grounding route (so-called power GND) for the power circuit and the grounding route (so-called signal GND) for the signal circuit are separated to prevent crosstalk between the both. Thus, it is possible to reduce influence of noise caused by a large current flowing in the power circuit or the like on the signal circuit, for example, in comparison with a case where the both are grounded simply by body earth (connected to the negative terminal of the power source through the vehicle body). As a result, reduction in sensitivity of the electric components or communication speed in the signal circuit can be suppressed so that the electric components can be more surely operated.

According to second aspect of the invention, relating to the item (2), the power circuit is connected to the negative terminal of the power source through the grounding route going through the vehicle body (by so-called body earth), while the signal circuit is connected to the negative terminal of the power source through the grounding route not going through the vehicle body (for example, directly through the trunk harnesses and the branch harnesses). Thus, it is possible to avoid crosstalk between the two grounding routes.

According to third aspect of the invention, relating to the item (3), for grounding the signal circuit (signal GND), the signal circuit (for example, a circuit connected to signal terminals of the electric components) can be connected directly to the negative terminal of the power source through signal earth lines belonging to the trunk harnesses and signal earth lines belonging to the branch harnesses. On the other hand, for grounding the power circuit (power GND), for example, the control boxes are grounded to the vehicle body so that the power circuit (for example, a circuit connected to power terminals of the electric components) can be connected via the vehicle body to the negative terminal of the power source through power earth lines belonging to the branch harnesses. In this manner, it is possible to separate the grounding route of the power circuit and the grounding route of the signal circuit from each other as described above.

According to fourth aspect of the invention, relating to the item (4), the control boxes and/or the electric components are arranged so that the power circuit can be grounded to the vehicle body (by body earth). For example, those are arranged to include terminals for body earth. Thus, it is possible to separate the grounding route of the power circuit and the grounding route of the signal circuit from each other as described above.

According to the invention, it is possible to provide a circuit body for a vehicle, in which the structure of the circuit body is simplified while keeping functions required as a circuit body for a vehicle.

Several aspects of the invention have been described briefly above. The further details of the invention will be made clearer if the following description is read through with reference to the accompanying drawings.

DETAILED DESCRIPTION

Embodiment

A circuit body (wire harness 1) for a vehicle according to an embodiment of the invention will be described below with reference to FIG. 1, FIGS. 2A and 2B, FIGS. 3A to 3C, and FIG. 4.

Figure 1:
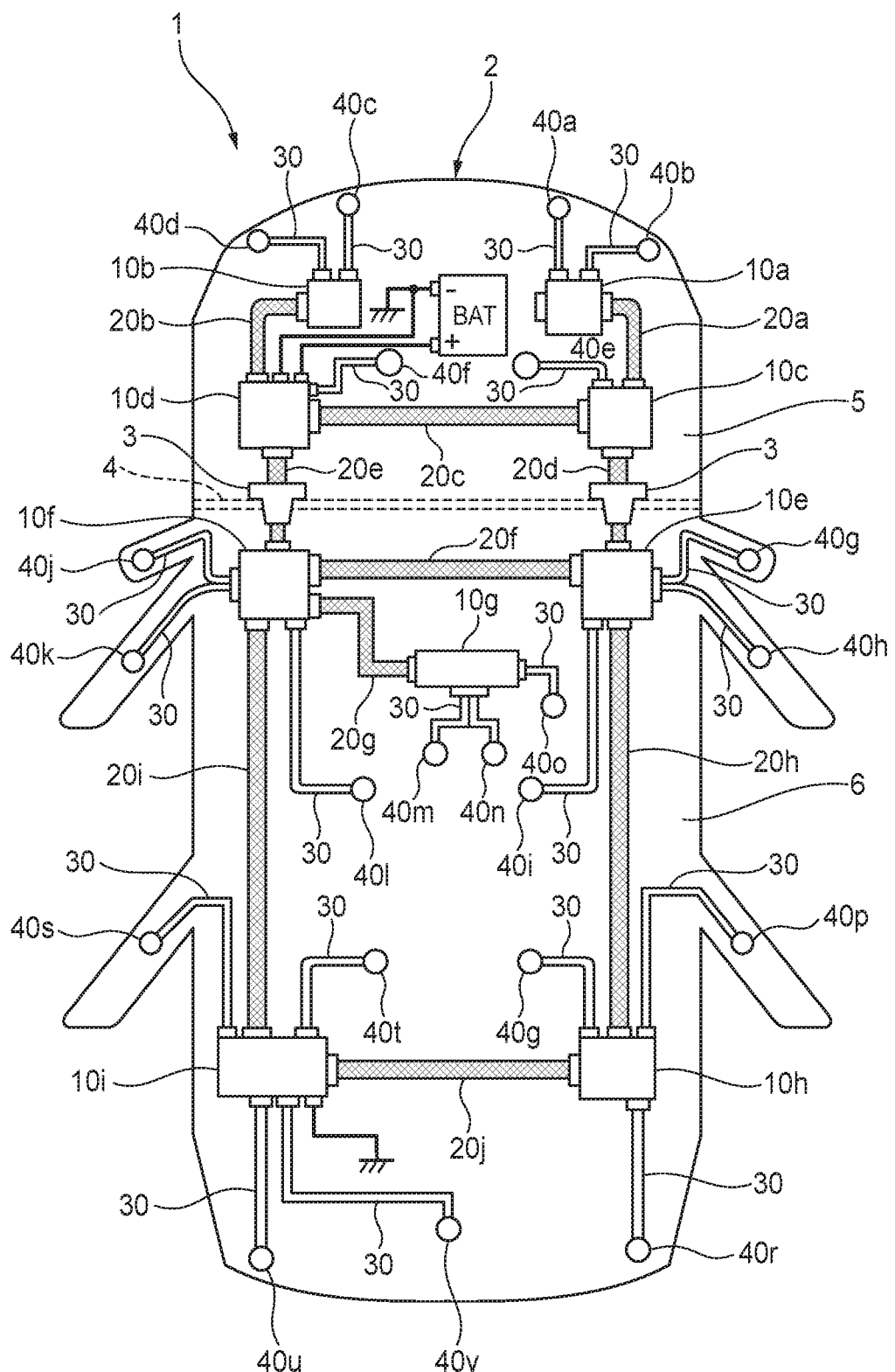
FIG. 1 is a schematic configuration view showing a state in which a wire harness according to an embodiment of the invention has been routed on a vehicle body.

As shown in FIG. 1, the wire harness 1 according to the embodiment of the invention is in use routed on a vehicle body 2 mounted with various electric components 40 (40a to 40v). The wire harness 1 has a plurality of electric connection boxes 10 (10a to 10i), trunk harnesses 20 (20a to 20i) each electrically connecting one electric connection box 10 to another electric connection box 10 adjacent thereto, and branch harnesses 30 each electrically connecting one electric connection box 10 to one electric component 40 adjacent thereto.

Each electric connection box 10 has a plurality of connector reception holes (not shown). A connector 24 (see FIGS. 2A and 2B) of at least one trunk harness 20 and a connector 34 (see FIGS. 3A-3C) of at least one branch harness 30 are connected to the connector reception holes of the electric connection box 10. Thus, the electric connection box 10 is connected to at least one other electric connection box 10 and at least one electric component 40. Of the electric connection boxes 10, only the electric connection box 10d is electrically connected directly to a power source BAT (a positive pole and a negative terminal thereof) mounted on the vehicle body 2.

Each electric connection box 10 has a microcomputer (not shown) internally. By use of the microcomputer, the electric connection box 10 can refer to ID information belonging to the other electric connection box 10 and the electric component 40 connected thereto through the trunk harness 20 and the branch harness 30, and identify the other electric connection box 10 and the electric component 40 connected thereto.

By use of the microcomputer and so on, each electric connection box 10 can control the electric component 40 connected thereto, based on a sensor signal, an operation signal, etc. transmitted from the other electric connection box 10 and the electric component 40 connected thereto through the trunk harness 20 and the branch harness 30. Further, when connected to two or more other electric connection boxes 10 through two or more trunk harnesses 20, each electric connection box 10 can perform relay transmission of a sensor signal, an operation signal, etc. and relay transmission of electric power with the two or more other electric connection boxes 10.

A circuit for supplying electric power from the power source BAT to each electric component 40 through each electric connection box 10 (a power system circuit connected to a power terminal of each electric component 40) will be referred to as "power circuit", and a circuit for transmitting a communication signal between each electric connection box 10 and each electric component 40 and between one electric connection box 10 and another electric connection box 10 adjacent thereto (a signal system circuit connected to a signal terminal of each electric component 40) will be referred to as "signal circuit".

Figure 2A:
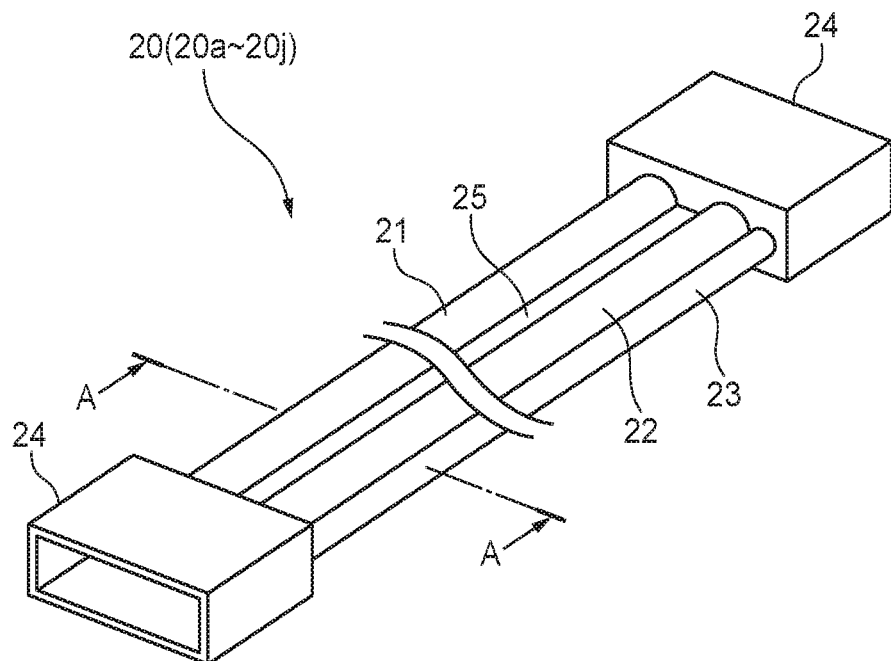
FIG. 2A is a perspective view of an I-type trunk harness connecting one electric connection box to another electric connection box as shown in FIG. 1.

As shown in FIG. 2A, each trunk harness 20 is a so-called I-type harness including a power line 21 for transmitting electric power, a communication line 22 for transmitting a sensor signal, an operation signal, etc. by multiplex communication, an earth line 23 forming the grounding route for the signal circuit, and a pair of connectors 24 connected to opposite ends of the set of the power line 21, the communication line 22 and the earth line 23.

Figure 2B:
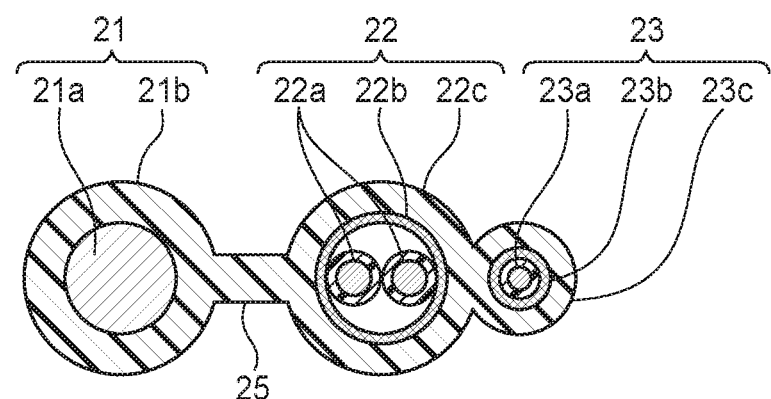
FIG. 2B is a sectional view taken on line A-A in FIG. 2A.

As shown in FIG. 2B, the power line 21 has a conductor line 21a provided for transmitting electric power and having a circular shape in section, and an insulator 21b covering the conductor line 21a and made of resin. The communication line 22 has a pair of electric wires 22a for transmitting signals, a braided conductor 22b covering the pair of electric wires 22a, and an insulator 22c covering the braided conductor 22b and made of resin. The braided conductor 22b has a function of preventing the signals transmitted by the pair of electric wires 22a from being affected by noise caused by an external magnetic field or the like. The earth line 23 has a signal earth line 23a forming the grounding route of the signal circuit, a braided conductor 23b covering the signal earth line 23a, and an insulator 23c covering the braided conductor 23b and made of resin. The braided conductor 23b has a function of preventing an earth current passing through the signal earth line 23a from being affected by noise caused by an external magnetic field or the like. Incidentally, each trunk harness 20 is not provided with any power earth line forming the grounding route of the power circuit.

The insulator 21b of the power line 21 and the insulator 22c of the communication line 22 are connected integrally with each other entirely in the extending direction of the trunk harness 20 due to a connection portion 25 made of resin. The insulator 22c of the communication line 22 and the insulator 23c of the earth line 23 are connected integrally with each other entirely in the extending direction of the trunk harness 20 so that the power line 21, the communication line 22 and the earth line 23 are arranged in a row in their width direction. A plurality of terminals (not shown) electrically connected to the conductor line 21a, the pair of electric wires 22a and the signal earth line 23a are provided in each connector 24. When a pair of the connectors 24 located at the opposite ends of the trunk harness 20 are inserted and connected to the connector reception holes of the electric connection boxes 10 adjacent to each other, the electric connection boxes 10 adjacent to each other are electrically connected to each other by the trunk harness 20 so that transmission of electric power and multiplex communication can be performed between the electric connection boxes 10 adjacent to each other.

Figure 3A:
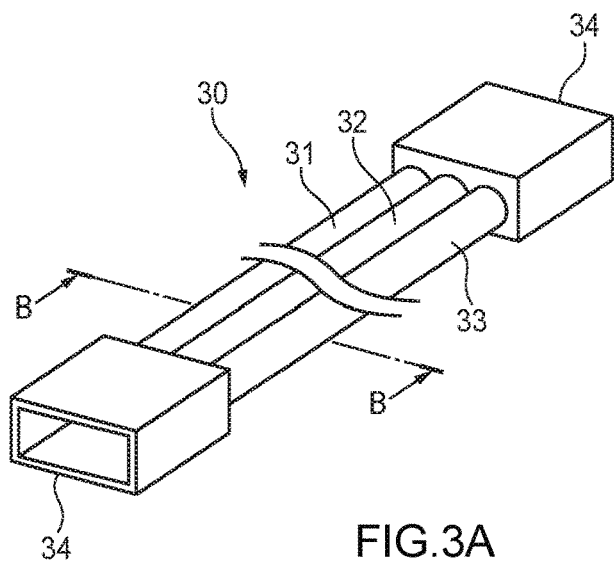
FIG. 3A is a perspective view of an I-type branch harness connecting an electric connection box to an electric component as shown in FIG. 1.
Figure 3B:
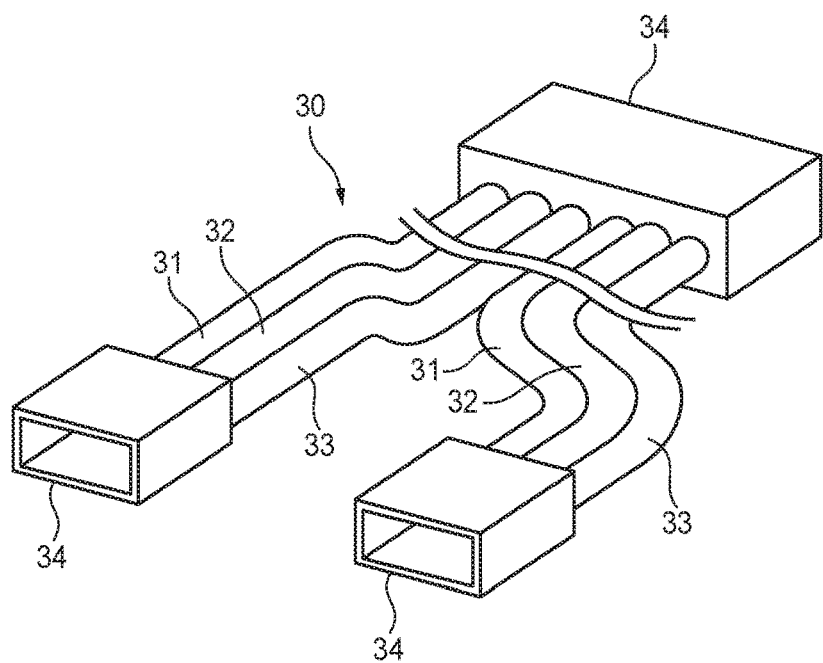
FIG. 3B is a perspective view of a V-type branch harness connecting an electric connection box to electric components as shown in FIG. 1.

As shown in FIG. 3A, each branch harness 30 is a so-called I-type harness including a power line 31 for transmitting electric power, a communication line 32 for transmitting a sensor signal, an operation signal, etc. by multiplex communication, an earth line 33 forming the grounding routes for the power circuit and the signal circuit, and a pair of connectors 34 connected to opposite ends of the set of the power line 31, the communication line 32 and the earth line 33. The branch harness 30 may be a so-called V-type harness including one connector 34 connected to two sets of power lines 31, communication lines 32 and earth lines 33 on one end side, and two connectors 34 each connected to one set of a power line 31, a communication line 32 and an earth line 33 on the other end side, as shown in FIG. 3B.

Figure 3C:
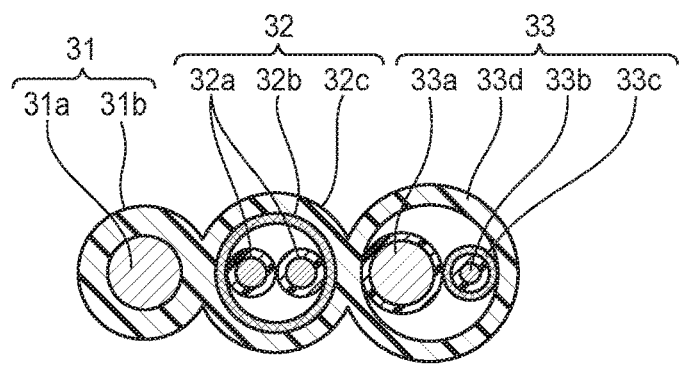
FIG. 3C is a sectional view taken on line B-B in FIG. 3A.

As shown in FIG. 3C, the power line 31 has a conductor line 31a provided for transmitting electric power and having a circular shape in section, and an insulator 31b covering the conductor line 31a and made of resin. The communication line 32 has a pair of electric wires 32a for transmitting signals, a braided conductor 32b covering the pair of electric wires 32a, and an insulator 32c covering the braided conductor 32b and made of resin. The braided conductor 32b has a function of preventing the signals transmitted by the pair of electric wires 32a from being affected by noise caused by an external magnetic field or the like. The earth line 33 has a power earth line 33a forming the grounding route of the power circuit, a signal earth line 33b forming the grounding route of the signal circuit, a braided conductor 33c covering the signal earth line 33b, and an insulator 33d covering the power earth line 33a and the braided conductor 33c and made of resin. The braided conductor 33c has a function of preventing an earth current passing through the signal earth line 33b from being affected by noise caused by an external magnetic field or the like.

The insulator 31b of the power line 31, the insulator 32c of the communication line 32 and the insulator 33d of the earth line 33 are connected integrally with one another entirely in the extending direction of the branch harness 30 so that the power line 31, the communication line 32 and the earth line 33 are arranged in a row in their width direction. A plurality of terminals (not shown) electrically connected to the conductor line 31a, the pair of electric wires 32a, the power earth line 33a and the signal earth line 33b are provided in each connector 34. When one of the connectors 34 located at one end of the branch harness 30 is inserted and connected to a connector reception hole of one electric connection box 10 and the other connector 34 located at the other end of the branch harness 30 is inserted and connected into a connector reception hole (not shown) of one electric component 40, electric connection between the electric connection box 10 and the electric component 40 is established by the branch harness 30 so that transmission of electric power and multiplex communication can be performed between the electric connection box 10 and the electric component 40.

In the example shown in FIG. 1, each electric connection box 10 is disposed in a position comparatively close to a position where the electric component 40 to be connected to the electric connection box 10 is mounted on the vehicle body 2. Therefore, the length of the branch harness 30 connected to the electric connection box 10 is comparatively short. In some cases, however, there is a long distance between adjacent two of the electric connection boxes 10. Therefore, some of the trunk harnesses 20 are comparatively long.

Specifically, in the example shown in FIG. 1, the electric connection box 10a is connected to a direction indicator lamp 40a of the right front of the vehicle body, and a right headlight 40b. The electric connection box 10b is connected to a left headlight 40c, and a direction indicator lamp 40d of the left front of the vehicle body. The electric connection box 10c is connected to a brake control module 40e. The electric connection box 10d is connected to a fuel injection control module 40f. The electric connection box 10e is connected to a right electric door mirror 40g, an electric component 40h of a right front door, and an electric component 40i around a right front electric seat. The electric connection box 10f is connected to a left electric door mirror 40j, an electric component 40*k* of a left front door, and an electric component 40*l* around a left front electric seat. The electric connection box 10*g* is connected to an electric component 40*m* around an air conditioner, an electric component 40*n* around a head-up display, and an electric component 40*o* around a steering. The electric connection box 10*h* is connected to an electric component 40*p* around a right rear door, an electric component 40*q* around a right rear electric seat, and a direction indicator lamp 40*r* of the right rear of the vehicle body. The electric connection box 10*i* is connected to an electric component 40*s* of a left rear door, an electric component 40*t* around a left rear electric seat, a direction indicator lamp 40*u* of the left rear of the vehicle body, and a high mount stop lamp 40*v*.

Here, the V-type branch harnesses 30 shown in FIG. 3B are used for the connection of the electric connection box 10*e* with the right electric door mirror 40*g* and the electric component 40*h* of the right front door, the connection of the electric connection box 10*f* to the left electric door mirror 40*j* and the electric component 40*k* of the left front door, and the connection of the electric connection box 10*g* to the electric component 40*m* around the air conditioner and the electric component 40*n* around the head-up display. The I-type branch harnesses 30 shown in FIG. 3A are used for the connections of the other electric connection boxes 10 to the electric components 40.

The electric connection boxes 10*a* and 10*c* are connected through the trunk harness 20*a*. The electric connection boxes 10*b* and 10*d* are connected through the trunk harness 20*b*. The electric connection boxes 10*c* and 10*d* are connected through the trunk harness 20*c*. The electric connection boxes 10*c* and 10*e* are connected through the trunk harness 20*d*. The electric connection boxes 10*d* and 10*f* are connected through the trunk harness 20*e*. The electric connection boxes 10*e* and 10*f* are connected through the trunk harness 20*f*. The electric connection boxes 10*f* and 10*g* are connected through the trunk harness 20*g*. The electric connection boxes 10*e* and 10*h* are connected through the trunk harness 20*h*. The electric connection boxes 10*f* and 10*i* are connected through the trunk harness 20*i*. The electric connection boxes 10*h* and 10*i* are connected through the trunk harness 20*j*.

Particularly the trunk harnesses 20*d* and 20*e* are inserted into through holes provided in a dash panel 4 of the vehicle body 2 respectively. Specifically, grommets 3 (exterior material) to which the trunk harnesses 20*d* and 20*e* are inserted are fixed to the through holes respectively, so as to liquid-tightly partition an engine room 5 and a vehicle cabin 6 from each other through the dash panel 4.

Figure 4:
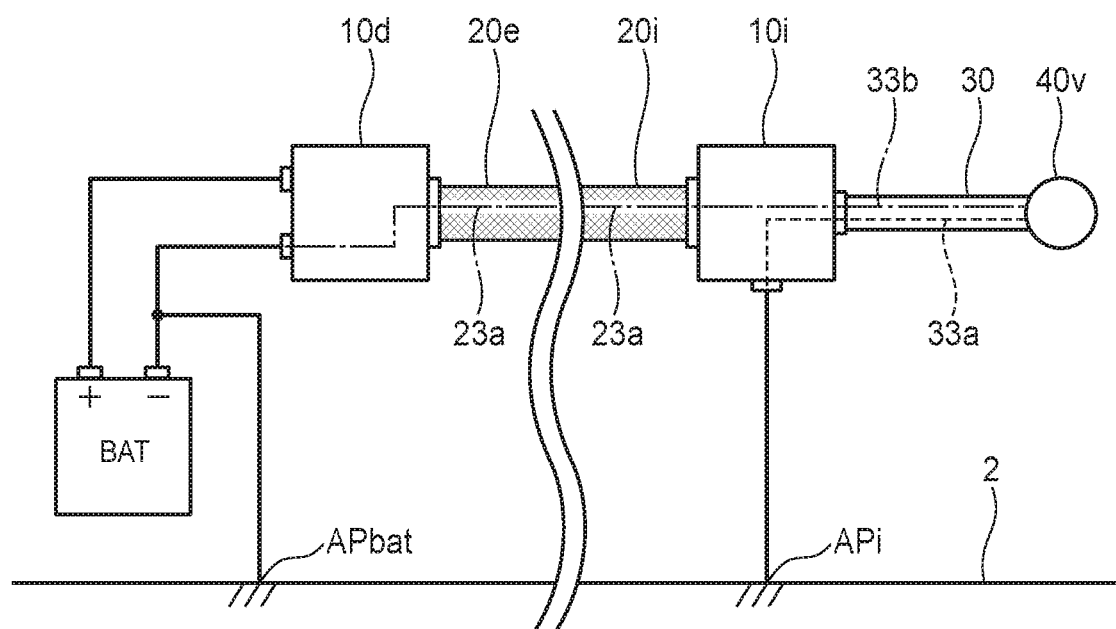
FIG. 4 is a view showing an electric component 40v shown in FIG. 1 in order to explain that a power circuit and a signal circuit are grounded through grounding routes different from each other.

Next, an earth (grounding) route for an electric component 40 and an electric connection box 10 connected to the electric component 40 will be described with reference to FIG. 4. In FIG. 4, an example of a grounding route for the electric component 40*v* and the electric connection box 10*i* connected to the electric component 40*v* is illustrated as a typical example.

Incidentally, in FIG. 4, for convenience of explanation, only the grounding route is shown, but the power line 21 and the power line 31 for supplying electric power or the communication line 22 and the communication line 32 for transmitting information are not shown.

In the example shown in FIG. 4, the electric connection box 10*i* is connected to an earth point APi of the vehicle body 2. In order to connect a power circuit of the electric connection box 10*i* to the earth point APi, for example, a body-earth terminal provided in the electric connection box 10*i* is electrically connected to the earth point APi, or when the electric connection box 10*i* has a housing made of metal, the housing is electrically connected to the earth point APi (by screwing or the like). The electric component 40*v* is not connected to any earth point of the vehicle body 2. A negative terminal of the power source BAT is connected to an earth point APbat of the vehicle body 2 different from the earth point APi.

A power circuit (the power line 31 not shown in FIG. 4, but see FIGS. 3A-3C) of the electric component 40*v* is electrically connected to the negative terminal of the power source BAT through the power earth line 33*a* of the branch harness 30 connecting the electric component 40*v* to the electric connection box 10*i*, an internal circuit of the electric connection box 10*i*, the earth point APi, and the earth point APbat.

On the other hand, a signal circuit (the signal line 32 not shown in FIG. 4, but see FIGS. 3A-3C) of the electric component 40*v* is electrically connected to the negative terminal of the power source BAT through the signal earth line 33*b* of the branch harness 30 connecting the electric component 40*v* to the electric connection box 10*i*, an internal circuit of the electric connection box 10*i*, the signal earth line 23*a* of the trunk harness 20*e*, an internal circuit of the electric connection box 10*f*, the signal earth line 23*a* of the trunk harness 20*e*, and an internal circuit of the electric connection box 10*d*.

Incidentally, a power circuit (the power line 21 not shown in FIG. 4, but see FIGS. 2A and 2B) of the electric connection box 10*i* is also electrically connected to the negative terminal of the power source BAT through the earth point APi, the vehicle body 2, and the earth point APbat. On the other hand, a signal circuit (the communication line 22 not shown in FIG. 4, but see FIGS. 2A and 2B) of the electric connection box 10*i* is electrically connected to the negative terminal of the power source BAT through the signal earth line 23*a* of the trunk harness 20*i*, an internal circuit of the electric connection box 10*f*, the signal earth line 23*a* of the trunk harness 20*e*, and an internal circuit of the electric connection box 10*d*.

In this manner, as for each of the electric component 40*v* and the electric connection box 10*i*, the power circuit is connected to the negative terminal of the power source BAT through the grounding route passing through the vehicle body 2 (by so-call body earth), and the signal circuit is connected to the negative terminal of the power source BAT through the grounding route bypassing the vehicle body 2 (directly through the trunk harness 20 and the branch harness 30). That is, the power circuit and the signal circuit are earthed (grounded) through grounding routes different from each other. To say other words, the grounding route of the power circuit and the grounding route of the signal circuit are separated from each other so as to prevent crosstalk between the two grounding routes.

Incidentally, in the example shown in FIG. 4, the power circuit of the electric connection box 10*i* is connected to the earth point APi of the vehicle body 2, but the power circuit of the electric component 40*v* is not connected to any earth point of the vehicle body 2. Therefore, the power earth line 33*a* of the branch harness 30 connecting the electric component 40*v* to the electric connection box 10*i* is provided only for grounding the power circuit of the electric component 40*v*.

However, the power circuit of the electric connection box 10*i* may be not connected to any earth point of the vehicle body 2, but the power circuit of the electric component 40*v* may be connected to an earth point of the vehicle body 2. In this case, the power earth line 33*a* of the branch harness 30 connecting the electric component 40*v* to the electric connection box 10*i* is provided only for grounding the power circuit of the electric connection box 10*i*. In order to make connection between the power circuit of the electric component 40*v* and the earth point, for example, a body-earth terminal provided in the electric component 40*v* may be electrically connected to the earth point, or when the electric component 40*v* has a housing made of metal, the housing may be electrically connected to the earth point (by screwing or the like).

Further, both the power circuit of the electric connection box 10*i* and the power circuit of the electric component 40*v* may be connected to an earth point of the vehicle body 2. In this case, the power earth line 33*a* may be removed in the branch harness 30 connecting the electric component 40*v* to the electric connection box 10*i*.

Although description has been made about the grounding routes as to the electric component 40*v* and the electric connection box 10*i* connected to the electric component 40*v* as shown in FIG. 4, the same thing can be applied to the grounding routes as to the other electric components 40 and the other electric connection boxes 10 connected to the electric components 40.

As for each electric component 40, in the example shown in FIG. 1, as described above, at least one of the power circuits of the electric component 40 and the electric connection box 10 connected to the electric component 40 is grounded to the vehicle body 2 (an earth point thereof). As a result, it is unnecessary to provide power earth lines in the trunk harnesses 20 connecting the electric connection boxes 10 to one another in order to ground the electric connection boxes 10. Therefore, in the wire harness 1, no electric earth line is provided in any trunk harness 20. As described above, some of the trunk harnesses 20 are comparatively long. Therefore, the total length of power earth lines in the wire harness as a whole can be made much shorter than that in a configuration in which power earth lines are provided in all the trunk harnesses 20 connecting the electric connection boxes 10 to one another. Thus, the wire harness 1 can be made lightweight and compact. Further, since the total length of the power earth lines is shortened on a large scale, it is possible to reduce on a large scale the degree of noise applied to the wire harness 1 due to the power earth lines functioning as antennas.

In the example shown in FIG. 1, a plurality of electric connection boxes 10 are connected through a plurality of trunk harnesses 20 so as to form a plurality of loop circuits. Specifically, formed are two loop circuits, that is, a loop circuit "from the electric connection box 10*c* through the trunk harness 20*c*, the electric connection box 10*d*, the trunk harness 20*e*, the electric connection box 10*f*, the trunk harness 20*f*, the electric connection box 10*e* and the trunk harness 20*d* back to the electric connection box 10*c*", and a loop circuit "from the electric connection box 10*e* through the trunk harness 20*f*, the electric connection box 10*f*, the trunk harness 20*i*, the electric connection box 10*i*, the trunk harness 20*j*, the electric connection box 10*h* and the trunk harness 20*h* back to the electric connection box 10*e*".

Therefore, even if abnormality such as disconnection occurs in a part of the trunk harnesses 20, a bypass route can be secured easily. Thus, the wire harness 1 can highly enhance the redundancy of a system using the wire harness 1.

As has been described, in the wire harness 1 according to the embodiment of the invention, the outline of the wire harness 1 is built by the trunk harnesses 20 and the branch harnesses 30, while supply of electric power and transmission of communication signals to the electric components 40 through the wire harness 1 are controlled by the electric connection boxes 10 disposed and distributed on the wire harness 1. Accordingly, for example, when the transmission of the communication signals is collected into a single line by multiplex communication among the electric connection boxes 10 and the transmission of the electric power is also collected into a single power line, the structure of the wire harness 1 can be simplified in comparison with a circuit configuration in which a power source is connected to electric components essentially in a one-to-one manner as in a background-art circuit body. In addition, when processing such as distribution of electric power to a plurality of systems, control of feeding or blocking of the electric power for each system, protection of the electric wires and the electric components 40 from an excessive current or the like, etc. is performed in the electric connection boxes 10, it is possible to dispense with any junction box used in the background-art circuit body. Thus, the structure of the wire harness 1 can be further simplified.

Further, the power circuit and the signal circuit formed by the electric connection boxes 10, the trunk harnesses 20 and the branch harnesses 30 are grounded through grounding routes different from each other. To say other words, the grounding route for the power circuit and the grounding route for the signal circuit are separated to prevent crosstalk between the both. Thus, it is possible to reduce influence of noise caused by a large current flowing in the power circuit or the like on the signal circuit, for example, in comparison with a case where the both are simply grounded by body earth (connected to the negative terminal of the power source through the vehicle body). As a result, reduction in sensitivity of the electric components 40 or communication speed in the signal circuit can be suppressed so that the electric components 40 can be more surely operated.

Further, the power circuit is connected to the negative terminal of the power source BAT through the grounding route going through the vehicle body 2 (by so-called body earth), while the signal circuit is connected to the negative terminal of the power source through the grounding route not going through the vehicle body 2 (for example, directly through the trunk harnesses 20 and the branch harnesses 30). Thus, it is possible to avoid crosstalk between the two grounding routes.

Further, for grounding the signal circuit, the signal circuit (for example, a circuit connected to signal terminals of the electric components 40) can be connected directly to the negative terminal of the power source BAT through the signal earth lines 23*a* belonging to the trunk harnesses 20 and the signal earth lines 33*b* belonging to the branch harnesses 30. On the other hand, for grounding the power circuit, for example, the electric connection boxes 10 are grounded to the vehicle body 2 so that the power circuit (for example, a circuit connected to power terminals of the electric components 40) can be connected via the vehicle body 2 to the negative terminal of the power source BAT through the power earth lines 33*a* belonging to the branch harnesses 30. In this manner, it is possible to separate the grounding route of the power circuit and the grounding route of the signal circuit from each other as described above.

Further, the control boxes 10 and/or the electric components 40 are arranged so that the power circuit can be grounded to the vehicle body 2 (by body earth). For example, those are arranged to include terminals for body earth. Thus, it is possible to separate the grounding route of the power circuit and the grounding route of the signal circuit from each other as described above.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

For example, the electric components 40 have ID information in the aforementioned embodiment. However, connectors provided in end portions of the branch harnesses 30 may have ID information in place of the electric components 40.

Further, each of the trunk harnesses 20 and the branch harnesses 30 has only one power line in the aforementioned embodiment (see FIGS. 2A-2B and FIGS. 3A-3C). However, each of the trunk harnesses 20 and the branch harnesses 30 may be arranged to have a plurality (for example, two) of power lines if necessary.

Further, the earth line 23 of each trunk harness 20 does not have any power earth line, but has only the signal earth line 23a in the aforementioned embodiment (see FIGS. 2A-2B). However, the trunk harness 20 may have a power earth line if necessary.

In addition, each electric connection box 10 may be arranged to have an antenna capable of establishing wireless communication to the outside in addition to the aforementioned various functions, so that various information exchanged with the outside can be processed, and the information can be transmitted and received through a communication line.

Here, the features of the aforementioned embodiment of the wire harness 1 according to the invention will be summarized and listed briefly in the following paragraphs (1) to (4).

(1) A circuit body (1) for a vehicle, the circuit body (1) being mounted on a vehicle body (2) to supply electric power from a power source (BAT) to an electric component (40) and to transmit a communication signal, the circuit body (1) comprising:
a plurality of control boxes (10) dispersedly arranged on the circuit body (1) and configured to be able to control input and output of at least one of the electric power and the communication signal;
a trunk harness (20) connecting one of the control boxes (10) to another of the control boxes (10); and
a branch harness (30) connecting the control box (10) to the electric component (40),
the control boxes (10), the trunk harness (20) and the branch harness (30) being configured to ground a power circuit and a signal circuit through grounding routes different from each other, the power circuit supplying the electric power from the power source (BAT) to the electric component (40) through the control boxes (10), the signal circuit transmitting the communication signal between the control boxes (10) and the electric component (40) and between one of the control boxes (10) and another of the control boxes (10).

(2) The circuit body (1) according to item (1), wherein:
the power circuit is connected to a negative terminal of the power source (BAT) through a grounding route that goes through the vehicle body (2); and
the signal circuit is connected to the negative terminal of the power source (BAT) through a grounding route that does not go through the vehicle body (2).

(3) A circuit body (1) according to item (1) or item (2), wherein:
the trunk harness (20) includes a power line (21) for transmitting the electric power, a communication line (22) for transmitting the communication signal, and a signal earth line (23a) corresponding to the grounding route for the signal circuit; and
the branch harness (30) includes a power line (31) for transmitting the electric power, a communication line (32) for transmitting the communication signal, a signal earth line (33b) corresponding to the grounding route for the signal circuit, and a power earth line (33a) corresponding to the grounding route for the power circuit.

(4) A circuit body (1) according to any one of item (1) to item (3), wherein:
at least one of the control boxes (10) and the electric component (40) is configured to ground the power circuit to the vehicle body (2).

REFERENCE SIGNS LIST 1 wire harness
2 vehicle body
10 electric connection box (control box)
20 trunk harness
21 power line
22 communication line
23a signal earth line
30 branch harness
31 power line
32 communication line
33a power earth line
33b signal earth line
40 electric component
BAT power source

The invention claimed is:
1. A circuit body for a vehicle, the circuit body being mounted on a vehicle body to supply electric power from a power source to an electric component and to transmit a communication signal, the circuit body comprising:
a plurality of control boxes dispersedly arranged on the circuit body and configured to control input and output of at least one of the electric power and the communication signal;
a trunk harness connecting one of the control boxes to another of the control boxes; and
a branch harness connecting one of the control boxes to the electric component,
the control boxes, the trunk harness and the branch harness being configured to ground a power circuit and a signal circuit through grounding routes different from each other, the power circuit supplying the electric power from the power source to the electric component through the control boxes, the signal circuit transmitting the communication signal between the control boxes and the electric component and between one of the control boxes and at least a third one of the control boxes.

2. The circuit body according to claim 1, wherein:
the power circuit is connected to a negative terminal of the power source through one of the grounding routes that goes through the vehicle body; and
the signal circuit is connected to the negative terminal of the power source through one of the grounding routes that does not go through the vehicle body.

3. A circuit body according to claim 2, wherein:
the trunk harness includes a power line for transmitting the electric power, a communication line for transmitting the communication signal, and a signal earth line corresponding to a grounding route for the signal circuit; and
the branch harness includes a power line for transmitting the electric power, a communication line for transmitting the communication signal, a signal earth line corresponding to the grounding route for the signal circuit, and a power earth line corresponding to a grounding route for the power circuit,
wherein the signal circuit includes the communication line.

4. A circuit body according to claim 1, wherein:
at least one of the control boxes and the electric component is configured to ground the power circuit to the vehicle body.

* * * * *